United States Patent
Yuan et al.

(10) Patent No.: US 12,482,512 B2
(45) Date of Patent: Nov. 25, 2025

(54) ADAPTIVE REFRESH RATE GENERATOR

(71) Applicant: Silicon Laboratories Inc., Austin, TX (US)

(72) Inventors: Gang Yuan, Austin, TX (US); Bertrand Jeffery Williams, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 244 days.

(21) Appl. No.: 18/343,007

(22) Filed: Jun. 28, 2023

(65) Prior Publication Data

US 2025/0006245 A1 Jan. 2, 2025

(51) Int. Cl.
  *G11C 11/4074* (2006.01)
  *G11C 11/406* (2006.01)
  *G11C 11/4099* (2006.01)

(52) U.S. Cl.
  CPC .... *G11C 11/4074* (2013.01); *G11C 11/40615* (2013.01); *G11C 11/4099* (2013.01)

(58) Field of Classification Search
  CPC .......... G11C 11/4074; G11C 11/40615; G11C 11/4099
  See application file for complete search history.

(56) References Cited

U.S. PATENT DOCUMENTS

| | | | |
|---|---|---|---|
| 9,673,797 B2* | 6/2017 | Kim | G01R 19/04 |
| 9,742,397 B2 | 8/2017 | Yuan et al. | |
| 2002/0140659 A1* | 10/2002 | Mikami | G09G 3/3258 345/90 |
| 2007/0210859 A1* | 9/2007 | Strange | H03F 1/301 330/296 |
| 2019/0379846 A1* | 12/2019 | Chen | H04N 25/772 |
| 2021/0067100 A1* | 3/2021 | Choi | H03F 1/342 |

* cited by examiner

*Primary Examiner* — Sultana Begum
(74) *Attorney, Agent, or Firm* — Trop, Pruner & Hu, P.C.

(57) ABSTRACT

In one embodiment, an apparatus includes: a replica sampler circuit to sample a first voltage that is based on a reference voltage, the replica sampler circuit to at least approximate a non-linearity of a bias generator. The replica sampler circuit may include: a switch circuit, when enabled, to pass the first voltage; and a capacitor coupled to the switch circuit, the capacitor to be charged by the first voltage. The apparatus also may include a comparator coupled to the replica sampler circuit, the comparator having a first input terminal to receive the sampled first voltage and a second input terminal to receive the reference voltage, where the comparator is to output a first signal having a first value when the sampled first voltage departs from the reference voltage by at least a threshold amount, to cause a refresh of at least a portion of the bias generator.

16 Claims, 7 Drawing Sheets

ADAPTIVE REFRESH RATE GENERATOR

BACKGROUND

In integrated circuits (ICs), a number of bias voltages and/or bias currents are required by various circuits of the IC. An on-chip bias generator generates one or more bias voltages to be used for the required bias voltages and/or currents. There are relatively tight tolerances for these outputs from the bias generator. As a result, these bias circuits are specified with a high degree of accuracy, which increases power consumption.

Typically, the bias generator is active, even when certain portions of the IC are in a low power state. To allow such circuits to operate at lower powers, a sampled bias generator may be used. When sampled, a refresh rate of the sampler corresponds to the on time of the bias generator. Thus, to reduce overall power the refresh rate for the bias generator may be reduced, e.g., according to a reduced duty cycle. Optimizing this duty cycle over a wide range of temperatures at which the IC could be used requires significant lab characterization. In addition, this time-consuming lab characterization results in an empirical refresh rate that is conservatively chosen to cover the worst corner cases, thus causing the refresh rate to be unnecessarily higher than needed for most cases, incurring more current consumption in sleep mode. This extensive lab characterization delays time to market. And the resulting refresh rate control also requires supportive circuits like a temperature sensor to determine operating temperature.

SUMMARY OF THE INVENTION

In one aspect, an apparatus includes: a first replica sampler circuit to sample a first voltage, the first voltage based on a reference voltage, the first replica sampler circuit to at least approximate a non-linearity of a first sampler circuit of a bias generator. The first replica sampler circuit may include: a first switch circuit, when enabled, to pass the first voltage; and a first capacitor coupled to the first switch circuit, the first capacitor to be charged by the first voltage. The apparatus also may include a first comparator coupled to the first replica sampler circuit, the first comparator having a first input terminal to receive the sampled first voltage and a second input terminal to receive the reference voltage, where the first comparator is to output a first signal having a first value when the sampled first voltage departs from the reference voltage by at least a threshold amount, to cause a refresh of at least a portion of the bias generator.

In an implementation, the apparatus further comprises the bias generator to generate at least one bias voltage. The bias generator may generate the first voltage and the reference voltage. The first sampler circuit of the bias generator may be a worst case sampler circuit of the bias generator, the worst case sampler circuit having a greatest expected non-linearity.

In one implementation, the apparatus further comprises an adaptive refresh rate generator (ARRG) comprising the first replica sampler circuit and the first comparator. The bias generator may include the ARRG. In an embodiment, the ARRG further comprises: a second replica sampler circuit to sample a second voltage, the second voltage based on the reference voltage, the second replica sampler circuit comprising: a second switch circuit, when enabled, to pass the second voltage; and a second capacitor coupled to the second switch circuit, the second capacitor to be charged by the second voltage; and a second comparator coupled to the second replica sampler circuit, the second comparator having a first input terminal to receive the sampled second voltage and a second input terminal to receive the reference voltage, where the second comparator is to output a second signal when the sampled second voltage departs from the reference voltage by at least a second threshold amount. In an example, the ARRG further comprises: a third replica sampler circuit to sample the reference voltage, the third replica sampler circuit comprising: a third switch circuit, when enabled, to pass the reference voltage; and a third capacitor coupled to the third switch circuit, the third capacitor to be charged by the reference voltage, wherein the third capacitor is larger than the first capacitor and the second capacitor.

In an implementation, the apparatus further comprises a logic circuit coupled to the first comparator and the second comparator and to output a trip signal based on at least one of the first signal or the second signal, where the at least part of the bias generator is to be refreshed based on the trip signal. The apparatus may further comprise a scheduler to schedule an override trigger to cause the bias generator to refresh the at least one bias voltage.

In another aspect, a method comprises: enabling a first replica sampler circuit to charge a first capacitor with a first reference voltage for a sample period; disabling the first replica sampler circuit to cause a first sampled voltage at an output of the first replica sampler circuit to drift; comparing the first sampled voltage with a second reference voltage; and based at least in part on the comparison, triggering a bias generator to cause a refresh of at least one bias voltage.

In an implementation, the method further comprises enabling the first replica sampler circuit to charge the first capacitor based at least in part on the comparison. The method may further include receiving the first reference voltage and the second reference voltage from the bias generator. The method may further include triggering the bias generator when the first sampled voltage departs from the second reference voltage by at least a threshold amount.

In an implementation, the method may further include: enabling a second replica sampler circuit to charge a second capacitor with a third reference voltage for the sample period; disabling the second replica sampler circuit to cause a second sampled voltage at an output of the second replica sampler circuit to drift; comparing the second sampled voltage with the second reference voltage; and based at least in part on the comparison, triggering the bias generator to cause the refresh of the at least one bias voltage. In an example, the method may further include: generating a first comparison signal based on comparing the first sampled voltage with the second reference voltage; generating a second comparison signal based on comparing the second sampled voltage with the second reference voltage; and triggering the bias generator to cause the refresh of the at least one bias voltage based on at least one of the first comparison signal or the second comparison signal.

In yet another aspect, an integrated circuit comprises: at least one analog peripheral circuit to perform at least one analog function and to use at least one bias reference signal; a baseband circuit coupled to the at least one analog peripheral circuit, the baseband circuit to process a digital signal; a bias generator to generate the at least one bias reference signal for use by the at least one analog peripheral circuit; and an ARRG coupled to the bias generator, where the ARRG comprises a relaxation oscillator configured to adaptively control a refresh rate for the bias generator based on process, voltage and temperature of the integrated circuit.

In an implementation, the relaxation oscillator comprises: a plurality of a replica sampler circuits each to sample a voltage, each of the plurality of replica sampler circuits to model operation of corresponding sampler circuits of the bias generator; and a comparator coupled to the plurality of replica sampler circuits, the comparator to compare a first sampled voltage from a first replica sampler circuit to a second sampled voltage from a second replica sampler circuit and output a comparison signal based on the comparison.

In an implementation, the integrated circuit further comprises a controller coupled to the ARRG, where the controller is to trigger a refresh of the bias generator based on the comparison signal. The controller may trigger a refresh of the ARRG concurrently with the refresh of the bias generator.

DETAILED DESCRIPTION

In various embodiments, an adaptive refresh rate generator (ARRG) is provided to dynamically control a refresh rate of a bias generator. More specifically, this ARRG is configured to adaptively control the refresh rate based at least in part on one or more of process, voltage and temperature of an IC in which it is included. An ARRG in accordance with an embodiment can automatically generate a most proper refresh rate for bias reference refreshing circuits, where this refresh rate tracks temperature and process variation. Thus a bias generator can be refreshed at a lowest frequency rate possible while still maintaining accuracy.

With this hardware-based circuit, silicon characterization efforts may be significantly reduced, while at the same time reducing power consumption at higher temperatures, by controlling the refresh rate to occur at lower frequencies, even in the presence of high temperatures. In addition, by providing an ARRG in accordance with an embodiment, scheduling circuitry such as a hardware (or software) scheduler of a digital controller can be simplified, as the ARRG can operate independently of such higher level control. Note that in some instances, this scheduler may still schedule a refresh operation at a relatively slow rate (e.g., 1 Hertz) to ensure that a minimal refresh cycle exists.

Embodiments may leverage a device's leakage current to create an extremely low-frequency relaxation oscillator. The device leakage itself is also the culprit of the bias reference degradation after refreshing. Therefore, the oscillator's output frequency is aligned with the bias reference degradation to the same rate. When the device leakage increases due to temperature change or process variation, the generated refresh rate also increases at the same rate, to compensate for the faster degradation of the bias reference.

Figure 1A:
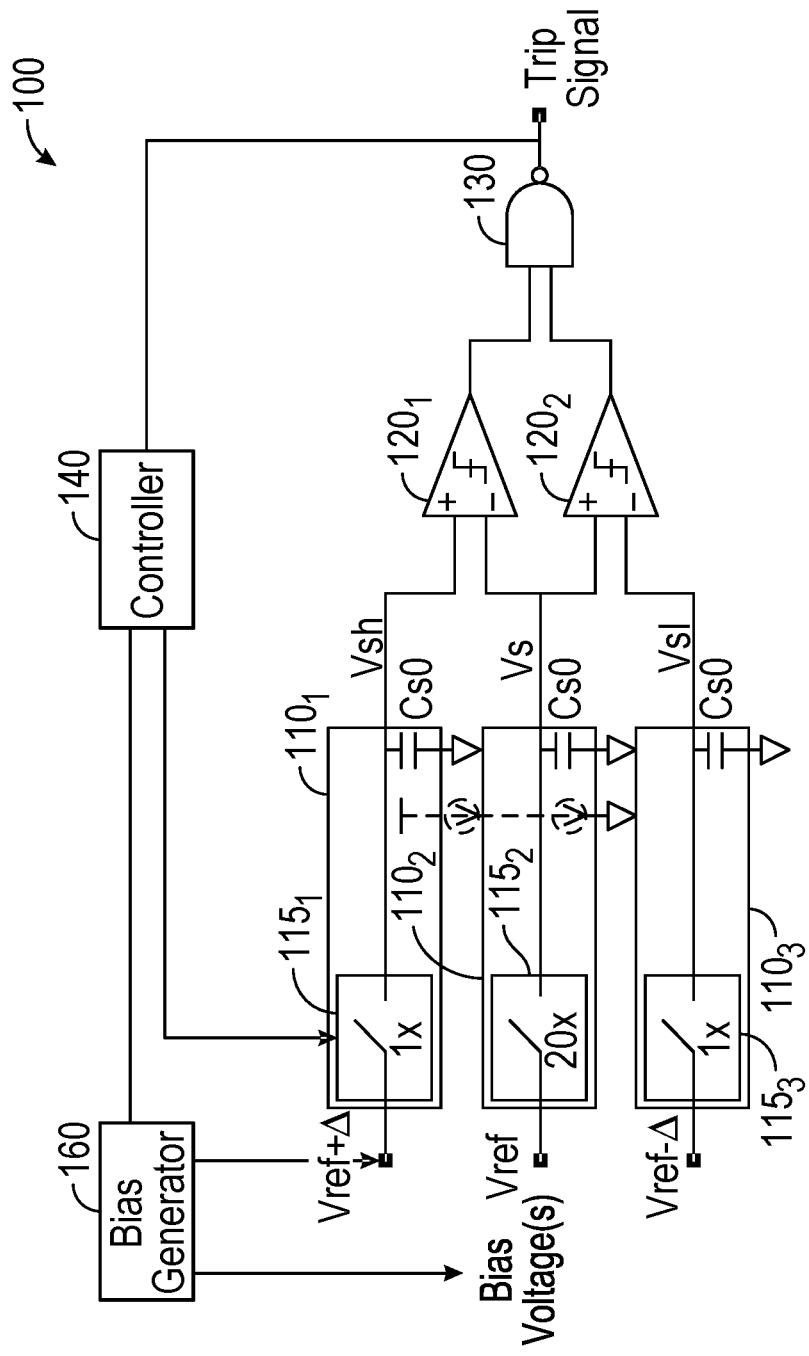
FIG. 1A is a schematic diagram of an adaptive refresh rate generator in accordance with an embodiment.

Referring now to FIG. 1A, shown is a schematic diagram of an adaptive refresh rate generator 100 in accordance with an embodiment. As shown in FIG. 1A, ARRG 100 includes a plurality of sample and hold circuits (also called "sampler circuits" herein), along with corresponding comparators and logic circuitry. Specifically as shown in FIG. 1A, a plurality of sampler circuits $110_{1-3}$ are provided. As shown, each sampler circuit 110 includes a corresponding switch circuit $115_1$-$115_3$ and an associated capacitor $C_{s0}$. Although shown as a single switch in the high level of FIG. 1A, understand that in an embodiment each switch circuit 115 may be implemented with a plurality of switches, e.g., metal oxide semiconductor field effect transistors (MOSFETs), which can be independently controlled to enable a sampling phase to occur with minimal switching impact (e.g., by controlling a set of MOSFETS in a sequenced manner to reduce loading effects and/or kickback effects of switching activity). However in other implementations, there may be a single switch per switch circuit 115.

In embodiments, sampler circuits 110 may be configured as replica sampler circuits. That is, these circuits may be replicas of corresponding sampler circuits present within a bias generator 160. Although ARRG 110 and bias generator 160 are shown separately in the embodiment of FIG. 1A, in various implementations, an ARRG in accordance with an embodiment may be included within a bias generator.

In particular embodiments, one or more of sampler circuits 110 may be replicas of worst case sampler circuits of the bias generator, i.e., those circuits having the highest leakage currents. Stated another way, one or more of sampler circuits 100 may be configured to model (e.g., at least approximately) non-linearities of corresponding sampler circuits of the bias generator. As such, this replica circuitry can be used to identify worst case leakage currents and control the refresh rate based thereon to ensure that one or more bias voltages generated using the worst case sampler circuitry within the bias generator remain within tolerances. This worst case configuration ensures that all other sampler circuits within the bias generator also remain within the tolerances (and thus resulting bias voltages remain within tolerances).

As further shown in FIG. 1A, each sampler circuit 110 is configured to receive a different reference voltage (which may be obtained from bias generator 160 itself). In the example shown, a first reference voltage $V_{ref}$ is provided to sampler circuit $110_2$, while second and third reference voltages (respectively $V_{ref}+\Delta$ and $V_{ref}-\Delta$) are provided to sampler circuits $110_1$ and $110_3$, respectively.

As shown, sampler circuit $110_2$ may be configured with larger-sized switching circuitry $115_2$ (e.g., 20×). In this way, a sampled voltage $V_s$ output from sampler circuit $110_2$ may drift at a faster rate than the sampled voltages $V_{sh}$ and $V_{sl}$ (output from sampler circuits $110_1$ and $110_3$). In a given implementation, sampling capacitors $C_{s0}$ may have a typical size of approximately 2.0 picofarads (pF). In representative embodiments, the delta value may be approximately +/−25 millivolts (mV). This delta value is chosen as the allowed level of drift, of the worst case sampler, between refresh intervals.

Figure 1B:
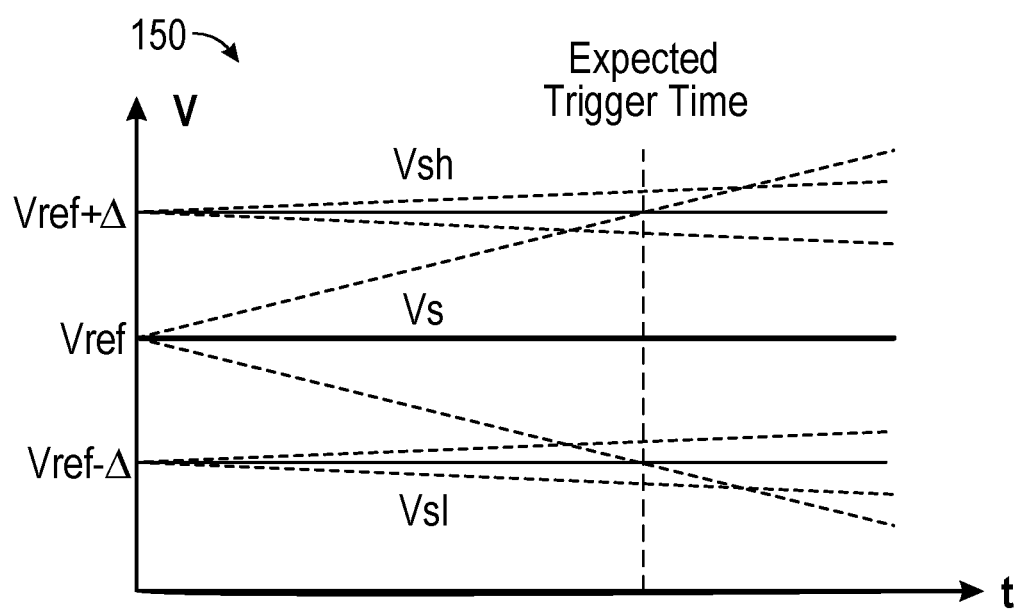
FIG. 1B is a graphical illustration of operation of the adaptive refresh rate generator of FIG. 1A.

FIG. 1B is a graphical illustration of operation of the adaptive refresh rate generator of FIG. 1A. As shown in the graphical illustration 150 in FIG. 1B, the sampled voltage $V_s$ (resulting from the $V_{ref}$ input) departs from its nominal value at a faster rate than the other sampled voltages $V_{sh}$ and $V_{sl}$. As illustrated in graphical illustration 150, when a given sampled voltage drifts and crosses a threshold, a refresh cycle is triggered to enable the sampled voltage to return to its original level (by charging the corresponding capacitors of the sampler circuits).

Still with reference to the schematic portion of FIG. 1A, the corresponding sampled voltages are provided to comparators $120_{1,2}$. Each comparator 120 may be configured with hysteresis. In operation, each comparator 120 is configured to output a comparison signal based on comparison of two sampled voltages. Namely, comparator $120_1$ outputs a first comparison signal based on a comparison of $V_{sh}$ to $V_s$, and similarly comparator $120_2$ outputs a second comparison signal based on a comparison of $V_{sl}$ to $V_s$.

These comparison signals are provided, in turn, to a logic circuit 130, implemented as an appropriate logic function, typically as simple as an AND or NAND gate, to generate a 'Trip Signal' when either comparator changes state. The output of logic gate 130, shown as this trip signal, when logic high, acts as a trigger to initiate a refresh operation of bias generator 160. Understand that this same trip signal may be configured to close the switches of $115_{1-3}$ to allow capacitor $C_{s0}$ to be charged.

FIG. 1A further illustrates interaction between ARRG 100 and bias generator 160 via a controller 140. As shown controller 140 is coupled to receive the trip signal. In response to this trip signal, controller 140 may send a control signal to bias generator 160 (and more specifically refresh circuitry of bias generator 160) to initiate the refresh operation. Concurrently, controller 140 may cause refresh of sampler circuits 110. As further shown, note that bias generator 160 may provide the reference voltages to ARRG 100.

In different implementations, a mechanism can be provided to either proportionally scale up leakage current, or proportionally scale down the sampling capacitor, to accelerate drift that can be detected by a comparator(s) easily. Across an entire IC's temperature range, and all process corners, leakage could degrade refreshed bias references by either charging the sampling capacitor or discharging the sampling capacitor. Thus in FIG. 1A, both directions can be detected, given the multiple sampler circuits and comparators. If the leakage current happens only on one polarity, then only one direction can be detected.

Although shown at this high level in the embodiment of FIG. 1A, many variations and alternatives are possible. For example, as just described in cases where an IC is known to have non-linearities in one direction, a single comparator can be provided to compare two reference voltages (e.g., $V_{ref}$ and one of $V_{ref+}\Delta$ or $V_{ref}-\Delta$). Still further in some implementations, it is possible to provide the baseline reference voltage $V_{ref}$ directly to comparators 120, avoiding the need for sampler circuit $110_2$. This is especially so when it is known that this reference voltage drifts slowly.

Figure 2A:
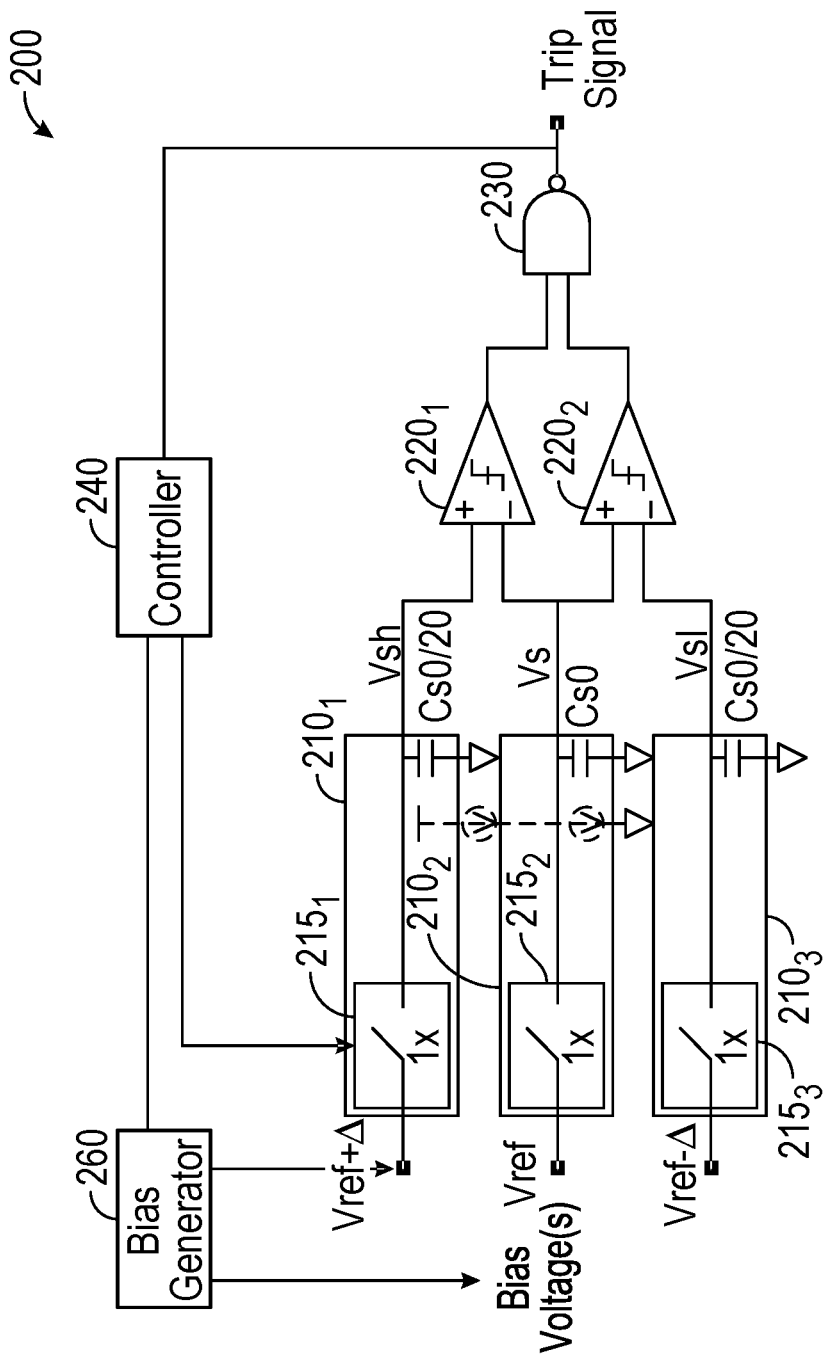
FIG. 2A is a schematic diagram of an adaptive refresh rate generator in accordance with another embodiment.

In other implementations, instead of providing equally-sized capacitors within the different sampler circuits, one larger capacitor can be provided. Referring now to FIG. 2A, shown is a block diagram of an ARRG in accordance with another embodiment. As shown in FIG. 2A, ARRG 200 is implemented similarly to ARRG 100 of FIG. 1A (with the same reference numerals, albeit of the "200" series"), and thus common components are not discussed further.

In this implementation, sampler circuits 210 have substantially equal-sized switching circuits 215 (in contrast to the FIG. 1A implementation). However here, sampler circuit $210_2$ includes a larger capacitor $C_{s0}$ and sampler circuits $210_{1,3}$ have smaller-sized capacitors (e.g., $C_{s0}/20$). As a result, the sampled voltage $V_s$ output from sampler circuit $210_2$ is more stable owing to the larger-sized capacitor.

Figure 2B:
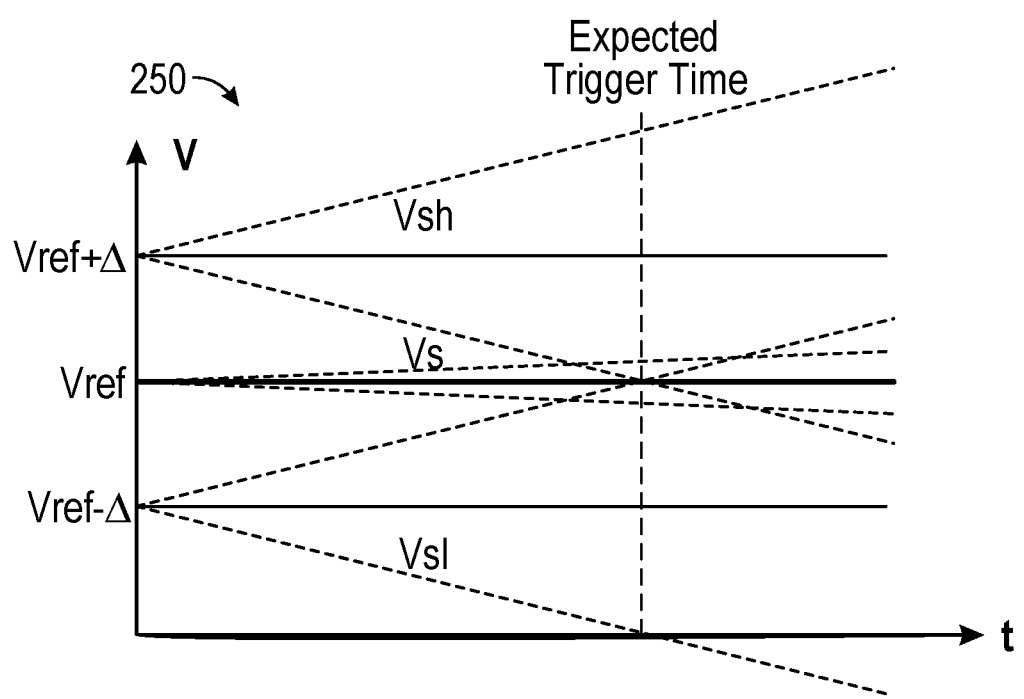
FIG. 2B is a graphical illustration of operation of the adaptive refresh rate generator of FIG. 2A.

FIG. 2B is a graphical illustration of operation of the adaptive refresh rate generator of FIG. 2A. Thus as shown in graphical illustration 250, in this implementation sampled voltage $V_s$ has very little drift as compared with the larger drifts of $V_{sh}$ and $V_{sl}$. With this configuration, ARRG 200 acts as a relaxation oscillator, which periodically resets at a given frequency whenever a refresh cycle is needed based upon one or more of process, voltage and temperature conditions.

Figure 3:
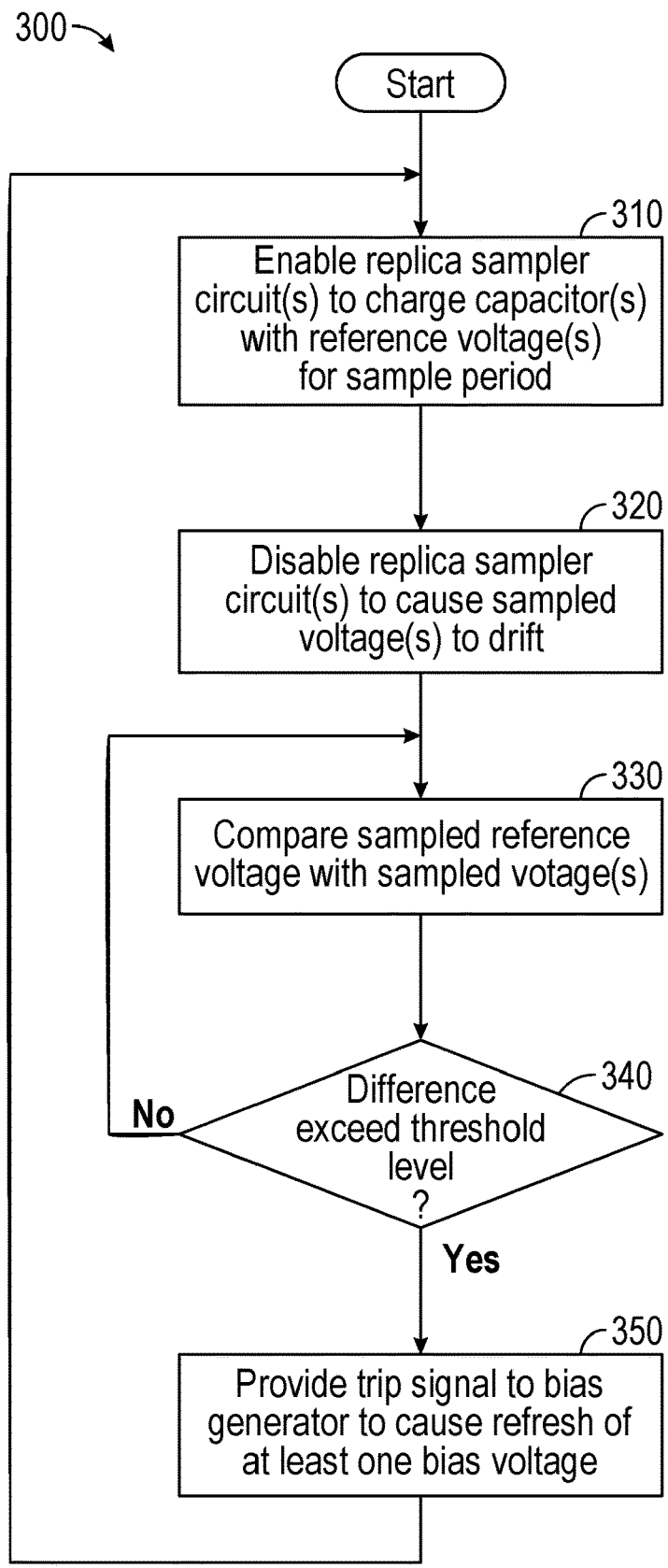
FIG. 3 is a flow diagram of a method in accordance with an embodiment.

Referring now to FIG. 3, shown is a flow diagram of a method in accordance with an embodiment. As shown in FIG. 3, method 300 is a method for controlling an adaptive refresh generator in accordance with an embodiment. As such, method 300 may be performed by hardware circuitry, such as the ARRGs shown in FIGS. 1A and 2A alone and/or in combination with firmware and/or software. Instructions of such firmware and/or software may be stored in a non-transitory storage medium.

As illustrated, method 300 begins by enabling one or more replica sampler circuits to charge capacitors with reference voltages for a given sample period (block 310). Thereafter at block 320, the replica sampler circuits are disabled. Note that this enabling and disabling at blocks 310 and 320 may be performed responsive to control signals that control the switch circuitry of the sampler circuits. In an embodiment, these control signals may be sent in response to a trip signal (as output by an ARRG). The disabling at block 320 causes the sampled voltage to drift over time, due to non-linearities, such as leakage currents.

Next at block 330, a sampled reference voltage is compared with the sampled voltages, e.g., in the comparators shown in FIGS. 1A and 2A. Based on this comparison, it is determined at diamond 340 whether a difference between the compared values exceeds a threshold level. If not, the sampled voltages have not drifted sufficiently to trigger a refresh.

Still with reference to FIG. 3, when it is determined the difference exceeds this threshold level, control passes from diamond 340 to block 350. At block 350, a trip signal is provided to the bias generator, which causes a refresh cycle to refresh at least one bias voltage maintained by sampling capacitors present in sampler circuits within the bias generator itself. Note that this same trip signal may trigger a refresh within the ARRG by enabling the replica sampler circuits (as shown at block 310). Understand while shown at this high level in the embodiment of FIG. 3, many variations and alternatives are possible.

Figure 4:
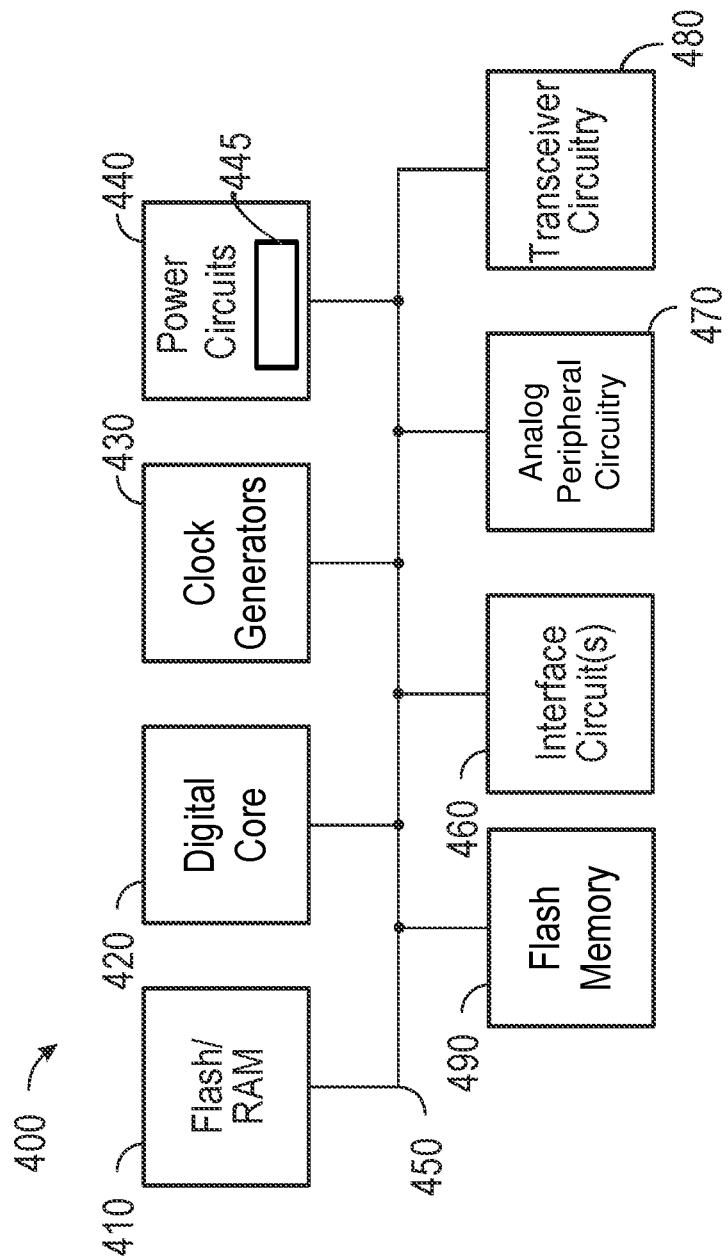
FIG. 4 is a block diagram of a representative integrated circuit that includes CFO compensation circuitry in accordance with an embodiment.

Referring now to FIG. 4, shown is a block diagram of a representative integrated circuit 400 that includes CFO compensation circuitry as described herein. In the embodiment shown in FIG. 4, integrated circuit 400 may be, e.g., a dual mode wireless transceiver that may operate according to one or more wireless protocols (e.g., WLAN and Bluetooth, among others) or other device that can be used in a variety of use cases. In one or more embodiments, the circuitry of integrated circuit 400 shown in FIG. 4 may be implemented on a single semiconductor die.

Integrated circuit 400 may be included in a range of devices including a variety of stations, including smartphones, wearables, smart home devices, other consumer devices, or industrial, scientific, and medical (ISM) devices, among others.

In the embodiment shown, integrated circuit 400 includes a memory system 410 which in an embodiment may include volatile storage, such as RAM and non-volatile memory as a flash memory. As further shown integrated circuit 400 also may include a separate flash memory 490 (or other non-volatile memory), optionally. Flash memory 490 may be implemented as a non-transitory storage medium that can store instructions and data.

Memory system 410 couples via a bus 450 to a digital core 420, which may include one or more cores and/or microcontrollers that act as a main processing unit of the integrated circuit. In turn, digital core 420 may couple to clock generators 430 which may provide one or more phase locked loops or other clock generator circuitry to generate various clocks for use by circuitry of the IC.

As further illustrated, IC 400 further includes power circuitry 440, which may include one or more voltage regulators. Power circuitry 440 may further include a bias generator 445, which may include an adaptive refresh rate generator in accordance with an embodiment. Additional circuitry may optionally be present depending on particular implementation to provide various functionality and interaction with external devices. Such circuitry may include interface circuitry 460 which may provide a LAN or other interface with various off-chip devices, and analog peripheral circuitry 470 which may provide a variety of analog functionality, such as analog-to-digital, digital-to-analog, or other purely analog functions (e.g., comparators, oscillators, filters, etc.) which require precision bias reference signals.

In addition as shown in FIG. 4, transceiver circuitry 480 (which may also receive bias reference signals from bias generator 445) may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. Understand while shown with this high level view, many variations and alternatives are possible.

Figure 5:
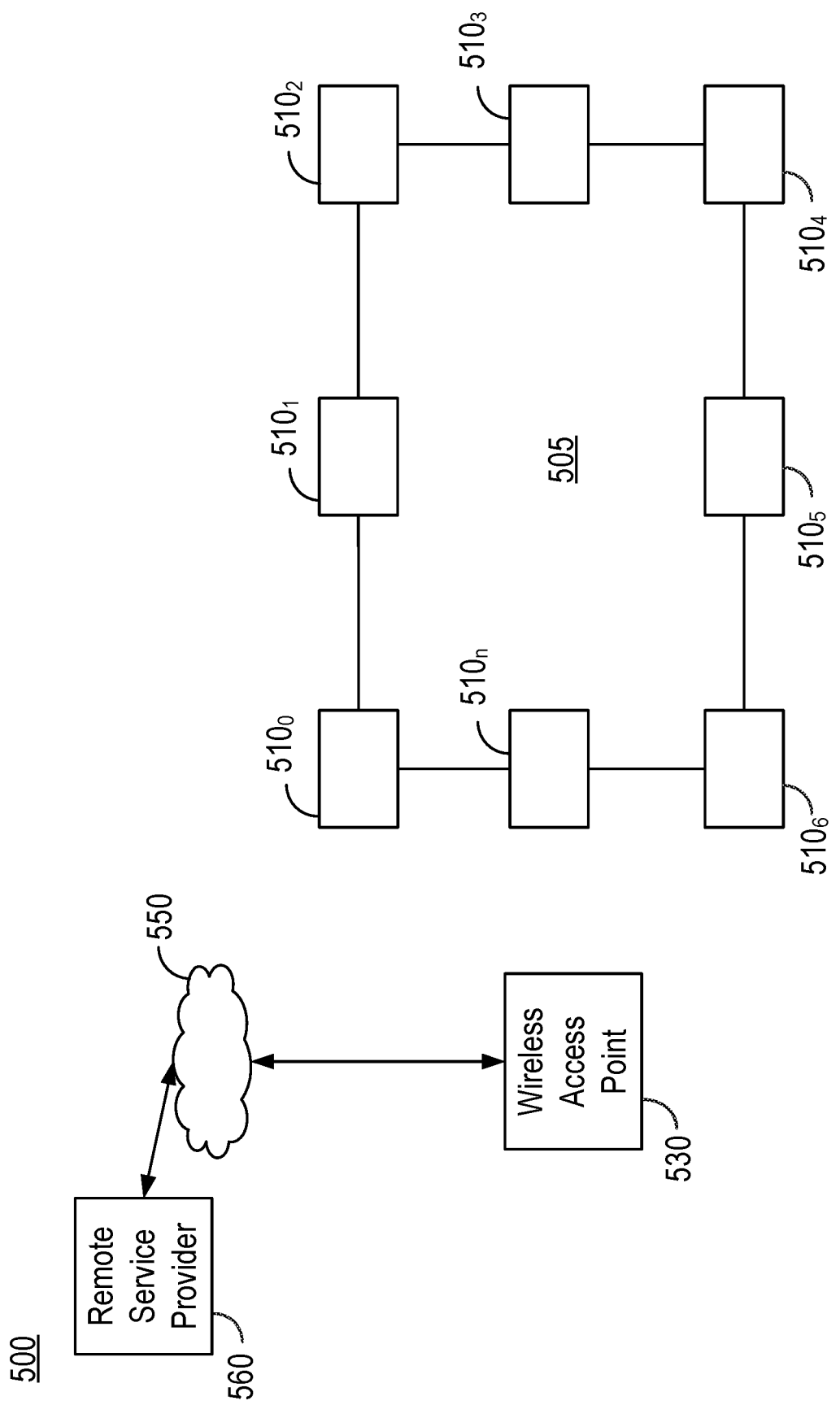
FIG. 5 is a high level diagram of a network in accordance with an embodiment.

ICs such as described herein may be implemented in a variety of different devices such as wireless stations, IoT devices or so forth. Referring now to FIG. 5, shown is a high level diagram of a network in accordance with an embodiment. As shown in FIG. 5, a network 500 includes a variety of devices, including wireless stations including smart devices such as IoT devices, access points and remote service providers, which may leverage embodiments of an adaptive refresh rate generator to refresh bias reference signals with low power consumption.

In the embodiment of FIG. 5, a wireless network 505 is present, e.g., in a building having multiple wireless devices $510_{0-n}$. As shown, wireless devices 510 couple to an access point 530 that in turn communicates with a remote service provider 560 via a wide area network 550, e.g., the internet. Understand while shown at this high level in the embodiment of FIG. 5, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
  a bias generator to generate at least one bias voltage; and
  an adaptive refresh rate generator (ARRG) comprising:
    a first replica sampler circuit to sample a first voltage, the first voltage based on a reference voltage, the first replica sampler circuit comprising:
      a first switch circuit, when enabled, to pass the first voltage; and
      a first capacitor coupled to the first switch circuit, the first capacitor to be charged by the first voltage;
    a first comparator coupled to the first replica sampler circuit, the first comparator having a first input terminal to receive the sampled first voltage and a second input terminal to receive the reference voltage, wherein the first comparator is to output a first signal having a first value when the sampled first voltage departs from the reference voltage by at least a threshold amount, to cause a refresh of at least a portion of the bias generator;
    a second replica sampler circuit to sample a second voltage, the second voltage based on the reference voltage, the second replica sampler circuit comprising:
      a second switch circuit, when enabled, to pass the second voltage; and
      a second capacitor coupled to the second switch circuit, the second capacitor to be charged by the second voltage; and
    a second comparator coupled to the second replica sampler circuit, the second comparator having a first input terminal to receive the sampled second voltage and a second input terminal to receive the reference voltage, wherein the second comparator is to output a second signal when the sampled second voltage departs from the reference voltage by at least a second threshold amount.

2. The apparatus of claim 1, wherein the bias generator is to generate the first voltage and the reference voltage.

3. The apparatus of claim 1, wherein a first sampler circuit of the bias generator comprises a worst case sampler circuit of the bias generator, the worst case sampler circuit having a greatest expected non-linearity.

4. The apparatus of claim 1, wherein the bias generator comprises the ARRG.

5. The apparatus of claim 1, wherein the ARRG further comprises:
  a third replica sampler circuit to sample the reference voltage, the third replica sampler circuit comprising:
    a third switch circuit, when enabled, to pass the reference voltage; and
    a third capacitor coupled to the third switch circuit, the third capacitor to be charged by the reference voltage, wherein the third capacitor is larger than the first capacitor and the second capacitor.

6. The apparatus of claim 1, further comprising a logic circuit coupled to the first comparator and the second comparator and to output a trip signal based on at least one of the first signal or the second signal, wherein the at least portion of the bias generator is to be refreshed based on the trip signal.

7. The apparatus of claim 1, further comprising a scheduler to schedule an override trigger to cause the bias generator to refresh the at least one bias voltage.

8. A method comprising:
  enabling a first replica sampler circuit to charge a first capacitor with a first reference voltage for a sample period;
  disabling the first replica sampler circuit to cause a first sampled voltage at an output of the first replica sampler circuit to drift;
  comparing the first sampled voltage with a second reference voltage; and
  based at least in part on the comparison, triggering a bias generator to cause a refresh of at least one bias voltage, the first replica sampler circuit to at least approximate a non-linearity of a first sampler circuit of the bias generator.

9. The method of claim 8, further comprising enabling the first replica sampler circuit to charge the first capacitor based at least in part on the comparison.

10. The method of claim 8, further comprising receiving the first reference voltage and the second reference voltage from the bias generator.

11. The method of claim 8, further comprising triggering the bias generator when the first sampled voltage departs from the second reference voltage by at least a threshold amount.

12. The method of claim 8, further comprising:
enabling a second replica sampler circuit to charge a second capacitor with a third reference voltage for the sample period;
disabling the second replica sampler circuit to cause a second sampled voltage at an output of the second replica sampler circuit to drift;
comparing the second sampled voltage with the second reference voltage; and
based at least in part on the comparison, triggering the bias generator to cause the refresh of the at least one bias voltage.

13. The method of claim 12, further comprising:
generating a first comparison signal based on comparing the first sampled voltage with the second reference voltage;
generating a second comparison signal based on comparing the second sampled voltage with the second reference voltage; and
triggering the bias generator to cause the refresh of the at least one bias voltage based on at least one of the first comparison signal or the second comparison signal.

14. An apparatus comprising:
a bias generator comprising a first sampler circuit, the bias generator to generate at least one bias voltage; and
an adaptive refresh rate generator (ARRG) comprising:
a first replica sampler circuit to sample a first voltage, the first voltage based on a reference voltage, the first replica sampler circuit to at least approximate a non-linearity of the first sampler circuit of the bias generator, the first replica sampler circuit comprising:
a first switch circuit, when enabled, to pass the first voltage; and
a first capacitor coupled to the first switch circuit, the first capacitor to be charged by the first voltage; and
a first comparator coupled to the first replica sampler circuit, the first comparator having a first input terminal to receive the sampled first voltage and a second input terminal to receive the reference voltage, wherein the first comparator is to output a first signal based on a comparison of the sampled first voltage and the reference voltage, and the bias generator is to refresh at least the first sampler circuit based at least in part on the first signal.

15. The apparatus of claim 14, wherein the ARRG further comprises:
a second replica sampler circuit to sample a second voltage, the second voltage based on the reference voltage, the second replica sampler circuit comprising:
a second switch circuit, when enabled, to pass the second voltage; and
a second capacitor coupled to the second switch circuit, the second capacitor to be charged by the second voltage; and
a second comparator coupled to the second replica sampler circuit, the second comparator having a first input terminal to receive the sampled second voltage and a second input terminal to receive the reference voltage, wherein the second comparator is to output a second signal based on a comparison between the sampled second voltage and the reference voltage.

16. The apparatus of claim 14, wherein the ARRG comprises a relaxation oscillator configured to adaptively control a refresh rate for the bias generator based on at least one of process, voltage or temperature of the apparatus.

* * * * *